H. C. NICHOLSON.
Churn.

No. 17,444.  Patented June 2, 1857.

UNITED STATES PATENT OFFICE.

HENRY C. NICHOLSON, OF MOUNT WASHINGTON, OHIO.

CHURN.

Specification of Letters Patent No. 17,444, dated June 2, 1857.

*To all whom it may concern:*

Be it known that I, HENRY C. NICHOLSON, of Mount Washington, in the county of Hamilton and State of Ohio, have invented a new and useful Improvement in Churns; and I do hereby declare that the following is a full and exact description thereof, reference being had to the accompanying drawings, making part of this specification, and to the letters of reference marked thereon.

The nature of my invention consists simply in fixing two wheels, similar in shape to the ordinary wind wheel, to an upright shaft; the wheels being supported by arms so bent as to place the wheels on a line with the shaft and with each other, so that when the shaft referred to is made to revolve on its axis, the wheels are thus driven through the cream and made to revolve rapidly upon their own axes; thus a double action is imparted to the wheels, which not only agitates the cream more perfectly, but gathers the butter to perfection without reversing or changing the motion.

In thus speaking of my invention, I speak not from theory alone, but from a practical knowledge; having given it a thorough test; and its utility is self evident, from the fact that it works easily—churns quickly—gathers the butter to perfection and is easily cleansed as well as cheaply and easily constructed. Good solid yellow butter has been made with it in four minutes, and when the cream is in good condition, it never requires more than ten minutes and the butter equally as good as that made in the old staff churn.

In order to enable others to make and use my invention, I will proceed to describe its construction.

Figure 1:
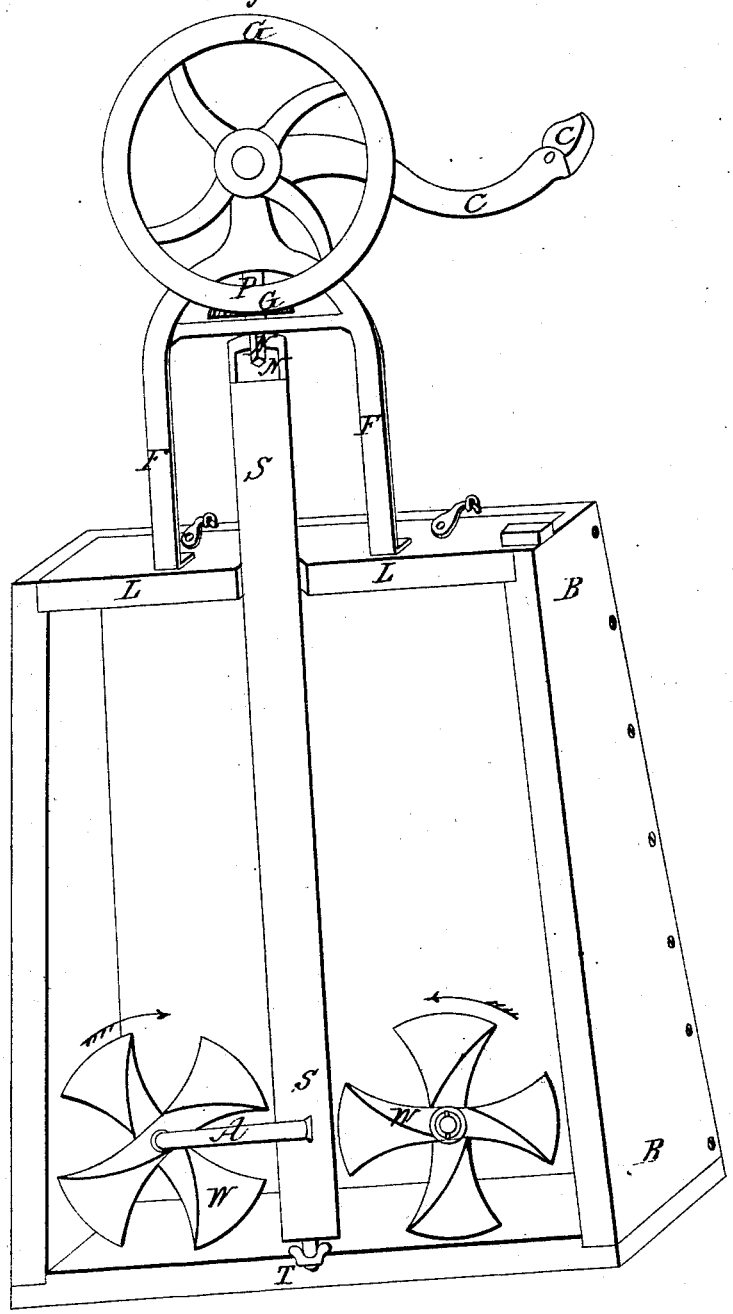

Figure 1, is a vertical section of the churn. C, C, represents the crank and handle—G G driving cog wheel,—P, pinion wheel driven by G,—N, N, gudgeon from the pinion P, also within the cap or head of shaft S. F, F support for the gearing fixed to L, L. L, L is the half lid of the churn, with hooks and button to fasten it on. B, B, is the box, put together with screws, rabbeted at top to receive the lid, also rabbeted at the corners to make broken joints, the bottom is also let in. The churn, however, may be differently constructed; either square, round, octagon or six sided. S, S, represents the upright shaft, the foot having a gudgeon working in step T in the center of the bottom. A, A the arms fixed in the shaft S, S, to support the wheels W. W, W, the fan shaped winged wheels—made of maple wood or other suitable material; the wheels have holes in their centers sufficiently large for the journals on the arms and for bushing made of hoop iron; the wheels are kept on their journals by means of a pin and washer. The wheels and arms should be so fixed and constructed that the wheels, when working, will revolve toward the shaft S, S, at their upper part.

Figure 2:
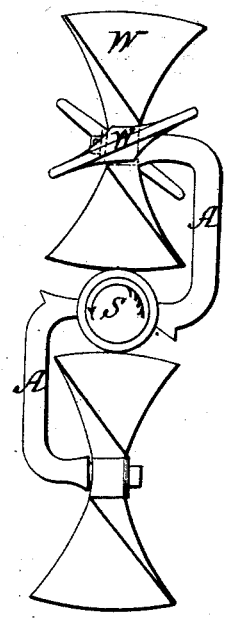

Fig. 2, represents more perfectly the shape of the arms A, A; it being a top view of the dasher, as composed of the shaft, arms and wheels; representing also a half wheel.

Having thus fully described the nature and object of my invention I would state that, I am aware flutter wheels have been used in churns, but in such manner as to prevent the free agitation of the cream, viz: by causing them to rotate against a division board, or by passing a hoop around their peripheries, either of which do not effect the object I have in view. I do not therefore claim either of these plans, but

What I do claim as new and desire to secure by Letters Patent is—

So arranging of the flutter wheels upon bent arms, as that the cream agitated by them shall not react against any dividing surface, or be impeded by any surrounding piece, and thus I allow the agitation to be more direct in a vertical line, and not follow the rotation of the shaft on which they are placed, as herein set forth and represented.

In testimony of which invention I hereunto set my hand.

H. C. NICHOLSON.

Attest:
LEVI S. KEELS,
J. R. BALDRIDGE.